United States Patent
Raj et al.

(10) Patent No.: US 11,425,016 B2
(45) Date of Patent: Aug. 23, 2022

(54) BLACK HOLE FILTERING

(71) Applicant: Hewlett Packard Enterprise Development LP, Houston, TX (US)

(72) Inventors: Anil Raj, Bangalore (IN); Anoop Govindan Nair, Bangalore (IN); Srijith Ponnappan, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 814 days.

(21) Appl. No.: 16/049,698

(22) Filed: Jul. 30, 2018

(65) Prior Publication Data

US 2020/0036617 A1    Jan. 30, 2020

(51) Int. Cl.
*H04L 43/10* (2022.01)
*H04L 41/06* (2022.01)
*H04L 45/00* (2022.01)
*H04L 9/40* (2022.01)

(52) U.S. Cl.
CPC .............. *H04L 43/10* (2013.01); *H04L 41/06* (2013.01); *H04L 45/00* (2013.01); *H04L 63/1458* (2013.01)

(58) Field of Classification Search
None
See application file for complete search history.

(56) References Cited

U.S. PATENT DOCUMENTS

| | | | |
|---|---|---|---|
| 7,302,705 B1 | 11/2007 | Boivie | |
| 7,873,993 B2 | 1/2011 | King | |
| 7,925,766 B2 | 4/2011 | Jayawardena et al. | |
| 9,397,924 B2 | 7/2016 | Mulligan et al. | |
| 9,503,321 B2 * | 11/2016 | Neginhal | H04L 41/0806 |
| 9,860,208 B1 * | 1/2018 | Ettema | G06F 21/552 |
| 2003/0137974 A1 * | 7/2003 | Kwan | H04L 45/04 370/352 |
| 2006/0242694 A1 * | 10/2006 | Gold | H04L 63/1441 726/13 |
| 2007/0058624 A1 * | 3/2007 | Ma | H04L 45/00 370/389 |
| 2009/0003348 A1 | 1/2009 | Kulkarni et al. | |
| 2013/0089094 A1 * | 4/2013 | Csaszar | H04L 45/00 370/390 |

(Continued)

OTHER PUBLICATIONS

IP Routing: OSPF Configuration Guide, Cisco IOS Release 15M&T Americas Headquarters Cisco Systems, Inc. 170 West Tasman Drive (Year: 2012).*

(Continued)

*Primary Examiner* — Eleni A Shiferaw
*Assistant Examiner* — Bassam A Noaman
(74) *Attorney, Agent, or Firm* — Hewlett Packard Enterprise Patent Department

(57) ABSTRACT

A system related to black hole filtering is provided. The system can allow a dynamic routing protocol on a network device to determine whether a route learned by the dynamic routing protocol is a black hole route. The route may be learned through another source. In response to a determination that the route is the black hole route, the dynamic routing protocol may generate a routing update that indicates the route as the black hole route. The dynamic routing protocol may then advertise the routing update to each neighbor network device.

18 Claims, 6 Drawing Sheets

(56) References Cited

U.S. PATENT DOCUMENTS

2013/0308441 A1* 11/2013 Zhang .................... H04L 45/28
370/219
2014/0331308 A1 11/2014 Smith et al.
2017/0272465 A1* 9/2017 Steele ................... H04L 63/107

OTHER PUBLICATIONS

The Magazine of USENIX & SAGE Feb. 2003 • vol. 28 • No. 1, Hankins: Introduction to the Border Gateway Protocol (Year: 2003).*
Vi. Das et. al. "Security Measures for Black Hole Attack in MANET: An Approach", Jun. 20212, Computer Science ArXiv. (Year: 2012).*
Moy, RFC 2328, "OSPF Version 2", Network Working Group, Apr. 1998, 188 pages.
Rekhter et al., RFC 4271, "A Border Gateway Protocol 4 (BGP-4)", Network Working Group, Jan. 2006, 90 pages.
Wikipedia, "Null route", available online at <https://web.archive.org/web/20180502144549/https://en.wikipedia.org/wiki/Null_route>, May 2, 2018, 1 page.
Remote Triggered Blackhole Filtering, (Research Paper), Apr. 13, 2014, 3 Pgs.
Remotely Triggered Black Hole Filtering-destination Based and Source Based, (Research Paper), Feb. 25, 2005, 37 Pgs.

* cited by examiner

BLACK HOLE FILTERING

BACKGROUND

In computer networking, a black hole refers to a place in a network where incoming or outgoing traffic is dropped, without informing the source that the data did not reach its intended recipient. A null route (or black hole route) is a network route that goes nowhere. Matching packets are dropped (ignored) rather than forwarded. The act of using null routes is referred to as black hole filtering.

BRIEF DESCRIPTION OF THE DRAWINGS

The following detailed description references the drawings, wherein.

DETAILED DESCRIPTION

Figure 1:
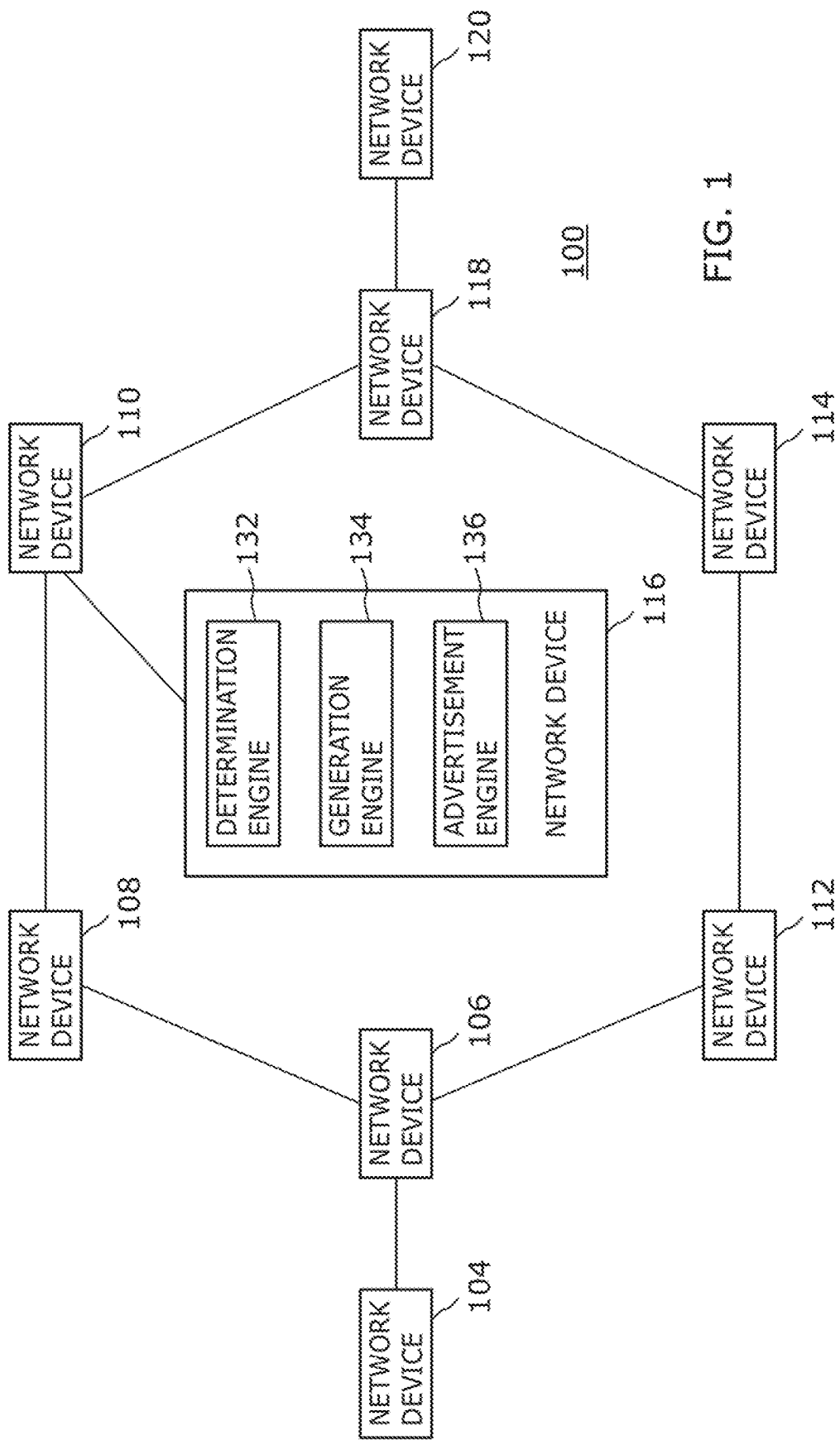
FIG. 1 is a block diagram of an example computing environment for black hole filtering.

Black hole routes may be used to drop undesirable traffic (for example, malicious traffic). In its simplest form, a black hole may be created on a network for a router to direct network traffic to a destination that just discards the traffic. A black hole route is used to forward unwanted or undesirable traffic into a black hole. Black hole routes may help by dropping malicious traffic if the network is under attack, such as in the case of a Distributed Denial of Service (DDoS) attack or a worm attack. Static routes may be created for destinations that are not desirable, and the static route configuration points to a black hole. Any traffic that has a destination address that has a best match of the black hole static route is automatically dropped.

Redistribution may be used by the routing protocols to advertise routes that are learned by other means such as through another routing protocol, static routes, or directly connected routes. Multi-protocol routing is common in medium to large networks managed by multiple network administrators, and in multi-vendor environments. Running different routing protocols is often part of a network design, and redistribution may be used in such scenarios. Differences in routing protocol characteristics such as metrics, administrative distance, classful and classless capabilities may be stamped into the redistributed route for the benefit of the receiving protocol.

Even though many of the capabilities of a route are retained while it is redistributed, the black hole property of a statically configured route may be lost when it is redistributed into a dynamic routing protocol. When a static black hole route is redistributed, dynamic protocols (e.g., Open Shortest Path First (OSPF)) may advertise this route into the network as an OSPF route with the Nexthop as the advertising router. This route may be further propagated into the network as an OSPF route with a valid Nexthop, and may be learned by all the routers in the network. This route can get further redistributed into other dynamic protocols as well, and may thus be further distributed into the network.

When a packet with destination matching this route arrives on any router on the network, then the receiving router may send traffic to the router where a static black hole route is configured, which in turn would drop that traffic. The number of hops the packet may need to traverse to finally get dropped depends on the size of the network, and the extent to which the black hole route was advertised in the network. When a packet lives for more time in the network, it causes network latency and associated issues. Needless to say, these are not desirable scenarios.

To address these technical challenges, the present disclosure describes various examples for performing black hole filtering. In an example, a dynamic routing protocol on a network device may determine whether a route learned by the dynamic routing protocol is a black hole route. In an example, the route may be learned through another source (for example, a second dynamic routing protocol). In response to a determination that the route learned by the dynamic routing protocol is the black hole route, the dynamic routing protocol may generate a routing update that indicates the route as the black hole route. The dynamic routing protocol may then advertise the routing update to each neighbor network device.

FIG. 1 is a diagram of an example computing environment 100 for performing black hole filtering. Computing environment 100 may include a plurality of network devices 104, 106, 108, 110, 112, 114, 116, 118, and 120. Although nine network devices are shown in FIG. 1, other examples of this disclosure may include more or less number than nine network devices.

Network devices 104, 106, 108, 110, 112, 114, 116, 118, and 120 may be communicatively coupled via a computer network. The computer network may be a wireless or wired network. The computer network may include, for example, a Local Area Network (LAN), a Wireless Local Area Network (WAN), a Metropolitan Area Network (MAN), a Storage Area Network (SAN), a Campus Area Network (CAN), or the like. Further, the computer network may be a public network (for example, the Internet) or a private network (for example, an intranet).

Network devices 104, 106, 108, 110, 112, 114, 116, 118, and 120 may each be, for example, a network router, a virtual router, a network switch, a virtual switch, and a bridge. In an example, network devices 104, 106, 108, 110, 112, 114, 116, 118, and 120 may each administer a dynamic routing protocol. Dynamic routing protocol enables routers to dynamically discover and maintain routes in routing tables, exchange routing updates with other routers, identify the best path to a destination network, and share a same network topology map with other routers in a network. Some examples of routing protocols include Interior Gateway Routing Protocol (IGRP), Enhanced Interior Gateway Routing Protocol (EIGRP), Open Shortest Path First (OSPF), Border Gateway Protocol (BGP), and Integrated Intermediate System Intermediate System (ISIS).

In an example, network devices 104, 106, 108, 110, 112, 114, 116, 118, and 120 may each establish a neighbor relationship with other network devices in the same area or different areas of network. Each network device 104, 106, 108, 110, 112, 114, 116, 118, and 120 may receive route update information from its neighbors. In an example, route update information may be received through a flooding process. Each network device 104, 106, 108, 110, 112, 114, 116, 118, and 120 may maintain a route table, for example, for storing its own route information and route update information obtained from its neighbors.

Route update information may include information about the state of a link(s) generated by a dynamic routing protocol. For example, in OSPF, route update information may be in form of Link State Advertisements (LSAs). Route update information may include, for example, information about neighbors such as neighbor ID, link type, and bandwidth. It may also include information about an interface such as IP address, subnet mask, type of network, and neighboring routers on the link. Each network device may flood its route update information to all neighbor routers. The neighbor network devices may store the information and forward it until all network devices have the same information. Once all the network devices have received the route update information, the network devices may generate a topological map of the network which may be used to determine the best routes to a destination router or node in the network.

In an example, a static black hole route may be configured on a network device (for example, 118) of computing environment 100. In an example, the black hole route may be installed in the hardware as follows: "Destination: a.b.c.d/z, Protocol: Static, Nexthop: null, Type: Blackhole", wherein "Destination" indicates the destination address for a packet; "Protocol": indicates the method through which a route is learned; "Nexthop" indicates a nexthop of the route; and "Type" indicates an action to be taken on the packet".

In an example, a network device (for example, 116) in the computing environment 100 may include a determination engine 132, a generation engine 134, and an advertisement engine 136. In an example, determination engine 132, generation engine 134, and advertisement engine 136 may be part of a dynamic routing protocol (for example, OSPF and BGP)

For the sake of simplicity in illustration, network device 116 is shown to include determination engine 132, generation engine 134, and advertisement engine 136. However, any of the other network devices (for example, 104, 106, 110, 112, 114, 118, or 120) could include these engines.

Engines 132, 134, and 136 may each include any combination of hardware and programming to implement the functionalities of the engines described herein. In examples described herein, such combinations of hardware and software may be implemented in a number of different ways. For example, the programming for the engines may be processor executable instructions stored on at least one non-transitory machine-readable storage medium and the hardware for the engines may include at least one processing resource to execute those instructions. In some examples, the hardware may also include other electronic circuitry to at least partially implement at least one engine of network device 116. In some examples, the at least one machine-readable storage medium may store instructions that, when executed by the at least one processing resource, at least partially implement some or all engines of network device 116. In such examples, network device 116 may include the at least one machine-readable storage medium storing the instructions and the at least one processing resource to execute the instructions.

In an example, determination engine 132 may determine whether a route learned by a dynamic routing protocol (for example, OSPF and BGP) on network device 116 is a black hole route. For example, dynamic routing protocol on network device 108 may learn about a static black hole route (Destination: a.b.c.d/z, Protocol: Static, Nexthop: null, Type: Blackhole) configured on network device 118. The black hole route may be learned by the dynamic routing protocol through another source. In an example, the dynamic routing protocol (for example, OSPF) may learn about the black hole route from a second routing protocol (for example, BGP), for example, through redistribution. Redistribution is used by a routing protocol to advertise routes that are learned by other means such as another routing protocol. In another example, the dynamic routing protocol (for example, OSPF) may learn about the black hole route from a static route. In a further example, the dynamic routing protocol (for example, OSPF) may learn about the black hole route from a directly connected route. In order to determine whether the route learned by the dynamic routing protocol is a black hole route, determination engine 132 may review a route entry for a route, and determine whether a property type in the route entry refers to a black hole.

Figure 2:
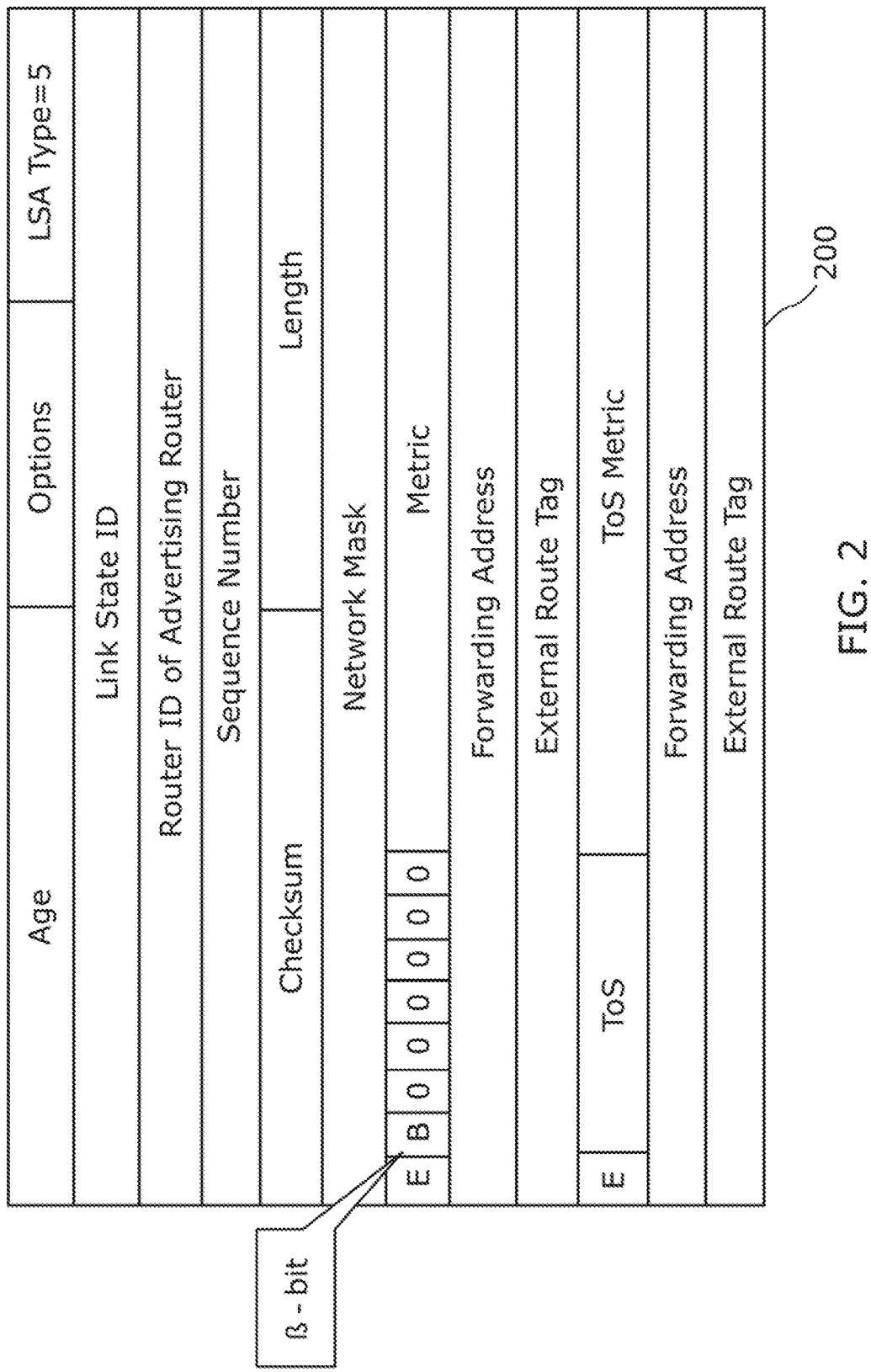
FIG. 2 is a block diagram of an example Open Shortest Path First (OSPF) Link State Advertisement (LSA)

In response to a determination that the route learned by the dynamic routing protocol is a black hole route, generation engine 134 may generate a routing update that indicates the route as a black hole route. The type of a routing update may vary depending on the dynamic routing protocol that generates it. For example, in OSPF, the routing update may be in the form of a Link State Advertisement (LSA). An Autonomous System (AS) external LSA (e.g., 200 of FIG. 2) may be used in the OSPF to advertise the routes that are redistributed from an external protocol. In an example, any of the seven unused bits in AS external LSA after the E-bit (External type) may be used to represent a black hole route. For instance, the second higher-order bit (the one next to E-bit) in the AS external LSA may be used to indicate if the route being advertised is a black hole route. In an example, this bit may be referred to as "B-bit" to indicate whether a route is a black hole route or not. If the B-bit is set, it indicates that the route being advertised is a black hole route, else the route is of forward type. This is illustrated in FIG. 2. Thus, when a static black hole route is redistributed into OSPF (or when a black hole route is redistributed from another protocol, for example, BGP), OSPF may store the route as a black hole route in its Link State Database (LSDB) and set the B-bit.

Figure 3:
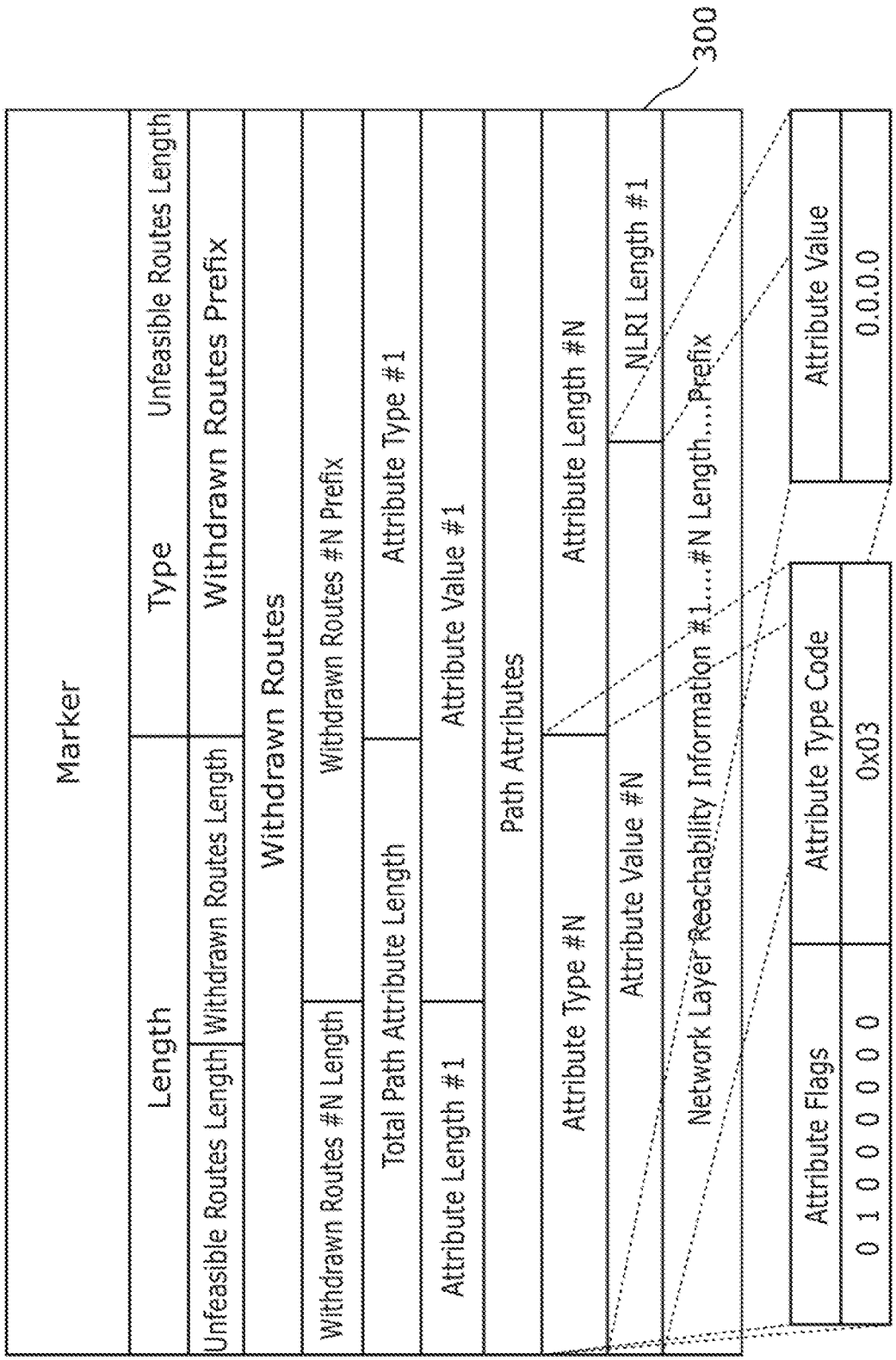
FIG. 3 is a block diagram of an example Border Gateway Protocol (BGP) update message.

In another example, if BGP is the dynamic routing protocol, the routing update may be in the form of an update message (e.g., 300 of FIG. 3) that is used to exchange Network Layer Leachability Information (NLRI) or route updates with a peer. In an example, the Attribute Type Code field in a BGP update message may be used to represent a black hole route. The attribute type code 3 (NEXT_HOP) may be used to define the IP address of the border router that is to be used as the Nexthop to a destination listed in the NLRI field of the UPDATE message. In an example, to announce a black hole route to a BGP peer, the BGP speaker may use a NULL IP address (0.0.0.0) as the NEXT_HOP. This is illustrated in FIG. 3.

Once the routing update is generated, advertisement engine 136 may advertise the routing update to each neighbor network device of network device 116. In case the routing update is generated by OSPF, OSPF may set the B-bit in the AS external ASA while advertising to its neighbors. A neighbor network device on receiving an LS update packet with B-bit may download the route into its route table or Forwarding Information Base (FIB) as a black hole route. For example, referring to FIG. 1, a neighbor network device (for example, 110) of network device 116 may install the black hole route entry in its routing table as follows: Destination: a.b.c.d/z, Protocol: OSPF, Nexthop: null, Type: Blackhole In another example, in case the routing update is generated by BGP, the BGP speaker may use a NULL IP address (0.0.0.0) as the NEXT_HOP, to announce a black hole route to a BGP peer (or neighbor). On the neighbor, when a BGP update packet is received with NEXT_HOP set to null IP address, the neighbor may install the route into its FIB as a black hole route. For example, referring to FIG. 1, a neighbor device (for example, 110) of network device 116 may install the black hole route entry in its routing table as follows; Destination; a.b.c.d/z, Protocol; BGP, Nexthop: null, Type: Blackhole In a like manner, network device 116 may flood the black hole route update information to all neighbor network devices. The neighbor network devices may store the information and forward it until all network devices in computing environment 100 have the same information. In this manner, the routing update related to the black hole route may be installed on each neighbor network router. Thus, with the proposed solution, a packet with destination matching "a.b.c.d/z" may be black holed or dropped on whichever network device it is received, and will not traverse through the entire network.

Figure 4:
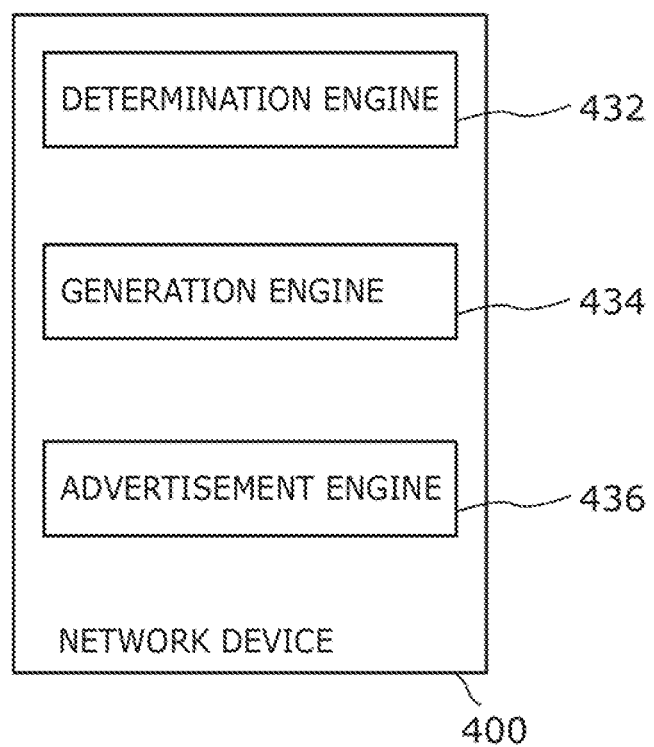
FIG. 4 is a block diagram of an example network device for black hole filtering.

FIG. 4 is a block diagram of an example network device 400 for black hole filtering. In an example, network device 400 may be analogous to any of the network devices 104, 106, 108, 110, 112, 114, 116, 118, and 120 of FIG. 1, in which like reference numerals correspond to the same or similar, though perhaps not identical, components. For the sake of brevity, components or reference numerals of FIG. 4 having a same or similarly described function in FIG. 1 are not being described in connection with FIG. 1. Said components or reference numerals may be considered alike.

Network device 400 may include, for instance, a network router, a virtual router, a network switch, a virtual switch, or any network device with routing functionality. In an example, network device 400 may support a dynamic routing protocol (for example, OSPF and BGP).

In the example of FIG. 4, network device 400 may include a dynamic routing protocol (for example, OSPF and BGP). The dynamic routing protocol may include a determination engine 432, a generation engine 434, and an advertisement engine 436. In an example, determination engine 432, generation engine 434, and advertisement engine 436 may perform functionalities similar to those described earlier in reference to determination engine 132, generation engine 134, and advertisement engine 136 of FIG. 1, respectively.

In an example, determination engine 432 may determine whether a route learned by the dynamic routing protocol is a black hole route. The route may be learned by the dynamic routing protocol through another source. In response to a determination that the route learned by the dynamic routing protocol is the black hole route, generation engine 434 may generate a routing update that indicates the route as the black hole route. Advertisement engine 436 may advertise the routing update to each neighbor network device.

Figure 5:
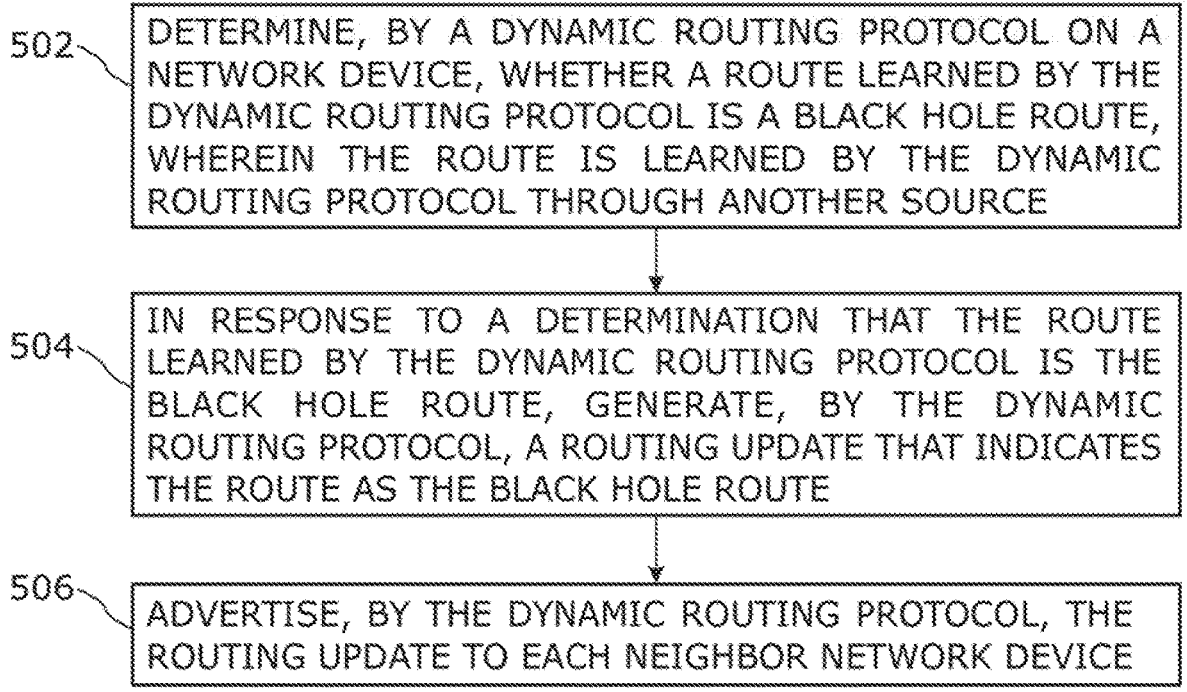
FIG. 5 is a flowchart of an example method for black hole filtering.

FIG. 5 is a block diagram of an example method 500 for performing black hole filtering. The method 500, which is described below, may be partially executed on a computing device such as network device 104, 106, 108, 110, 112, 114, 116, 118, or 120 of FIG. 1 or network device 400 of FIG. 4. However, other suitable computing devices may execute method 500 as well. At block 502, a dynamic routing protocol on a network device may determine whether a route learned by the dynamic routing protocol is a black hole route. In an example, the route may be learned through another source (for example, a second dynamic routing protocol). A block 504, in response to a determination that the route learned by the dynamic routing protocol is the black hole route, the dynamic routing protocol may generate a routing update that indicates the route as the black hole route. At block 506, the dynamic routing protocol may then advertise the routing update to each neighbor network device.

Figure 6:
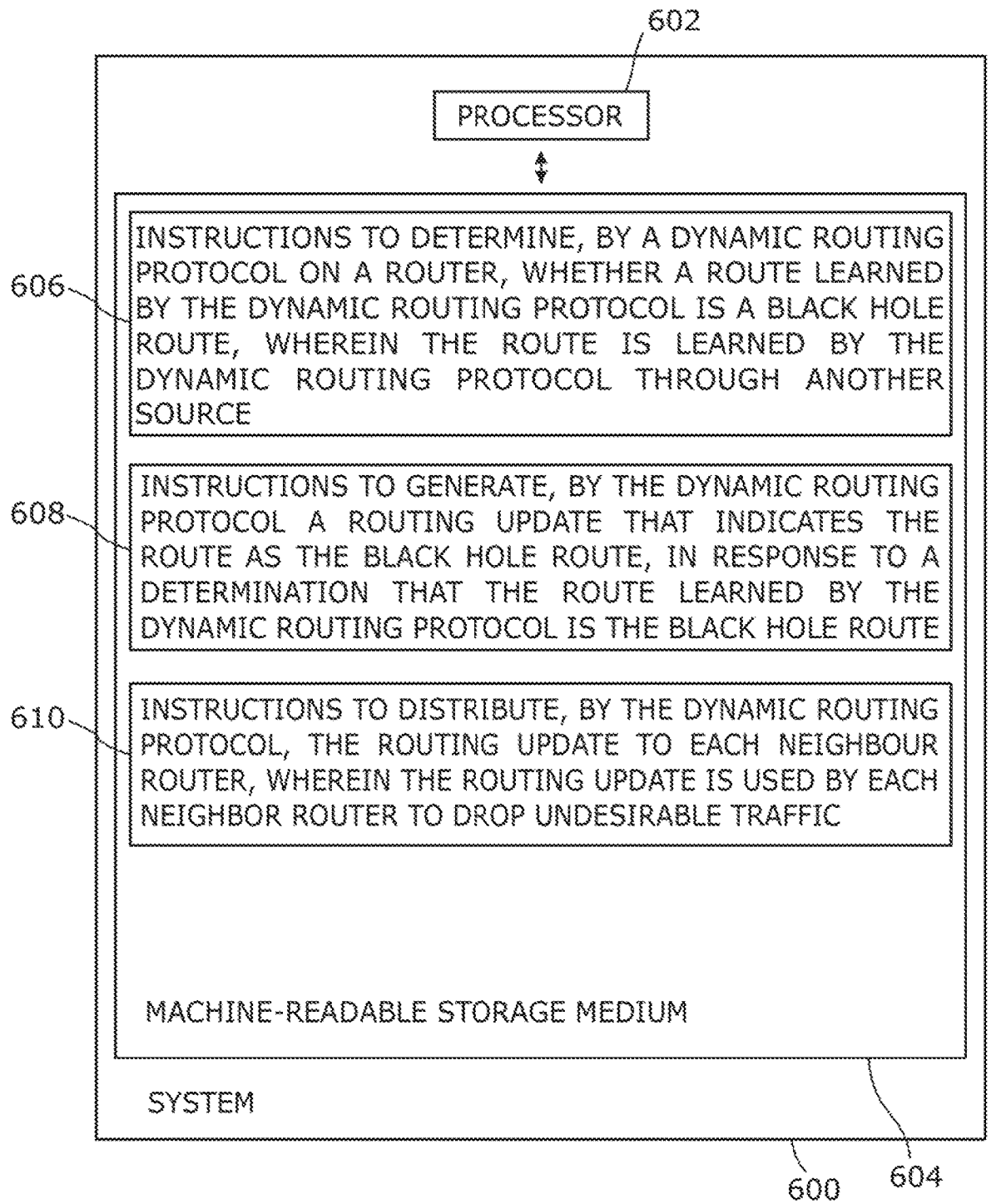
FIG. 6 is a block diagram of an example system including instructions in a machine-readable storage medium to perform black hole filtering.

FIG. 6 is a block diagram of an example system 600 for performing black hole filtering. System 600 includes a processor 602 and a machine-readable storage medium 604 communicatively coupled through a system bus. In an example, system 600 may be analogous to network device 104, 106, 108, 110, 112, 114, 116, 118, or 120 of FIG. 1, or network device 400 of FIG. 4. Processor 602 may be any type of Central Processing Unit (CPU), microprocessor, or processing logic that interprets and executes machine-readable instructions stored in machine-readable storage medium 604. Machine-readable storage medium 604 may be a random access memory (RAM) or another type of dynamic storage device that may store information and machine-readable instructions that may be executed by processor 602. For example, machine-readable storage medium 604 may be Synchronous DRAM (SDRAM), Double Data Rate (DDR), Rambus DRAM (RDRAM), Rambus RAM, etc. or storage memory media such as a floppy disk, a hard disk, a CD-ROM, a DVD, a pen drive, and the like. In an example, machine-readable storage medium may be a non-transitory machine-readable medium. Machine-readable storage medium 604 may store instructions 606, 608, and 610.

In an example, instructions 606 may be executed by processor 602 to determine, by a dynamic routing protocol on a router, whether a route learned by the dynamic routing protocol is a black hole route, wherein the route is learned by the dynamic routing protocol through another source. Instructions 608 may be executed by processor 602 to generate, by the dynamic routing protocol, a routing update that indicates the route as the black hole route, in response to a determination that the route learned by the dynamic routing protocol is the black hole route. Instructions 610 may be executed by processor 602 to distribute, by the dynamic routing protocol, the routing update to each neighbor router, wherein the routing update is used by each neighbor router to drop undesirable traffic.

For the purpose of simplicity of explanation, the example method of FIG. 5 is shown as executing serially, however it is to be understood and appreciated that the present and other examples are not limited by the illustrated order. The example systems of FIGS. 1, 4 and 6, and method of FIG. 5 may be implemented in the form of a computer program product including computer-executable instructions, such as program code, which may be run on any suitable computing device in conjunction with a suitable operating system (for example, Microsoft Windows, Linux, UNIX, and the like). Examples within the scope of the present solution may also include program products comprising non-transitory computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer. The computer readable instructions can also be accessed from memory and executed by a processor.

It should be noted that the above-described examples of the present solution is for the purpose of illustration.

Although the solution has been described in conjunction with a specific example thereof, numerous modifications may be possible without materially departing from the teachings of the subject matter described herein. Other substitutions, modifications and changes may be made without departing from the spirit of the present solution. All of the features disclosed in this specification (including any accompanying claims, abstract and drawings), and/or all of the parts of any method or process so disclosed, may be combined in any combination, except combinations where at least some of such features and/or parts are mutually exclusive.

The invention claimed is:

1. A method comprising:
   determining, by a dynamic routing protocol on a network device, whether a route entry stored in a local data structure corresponds to a black hole route based on a first indicator in the entry,
   wherein the route entry is generated from information learned by the dynamic routing protocol through another source;
   in response to a determination that the route entry corresponds to is the black hole route, generating, by the dynamic routing protocol at the network device, a route update advertisement that advertises a route of the route entry for the dynamic routing protocol, wherein the route update advertisement includes a second indicator that indicates the advertised route as the black hole route,
   wherein an unused bit in an Autonomous System (AS) external Link State Advertisement (LSA) associated with an Open Shortest Path First (OSPF) protocol is modified to facilitate the second indicator; and
   sending, by the dynamic routing protocol, the route update advertisement to a respective neighbor network device.

2. The method of claim 1, wherein the source includes one or more of: a second routing protocol, a static route, and a directly connected route.

3. The method of claim 1, wherein the data structure includes a routing table generated by the dynamic routing protocol.

4. The method of claim 3, wherein the routing table is a Forwarding Information Base (FIB).

5. The method of claim 1, wherein determining whether the route entry corresponds to the black hole route further comprises: reviewing the route entry for the route; wherein the first indicator is route type in the route entry.

6. The method of claim 1, wherein the dynamic routing protocol is one or more of: Open Shortest Path First (OSPF) and Border Gateway Protocol (BGP).

7. The method of claim 1, wherein generating the route update advertisement further comprises modifying an Attribute Type Code field in a BGP update message to facilitate the second indicator.

8. A network device, comprising:
   processing circuitry; a dynamic routing logic block to execute a dynamic routing protocol for the network device,
   wherein the dynamic routing logic block comprises:
   a determination logic block to determine whether a route entry stored in a local data structure corresponds to a black hole route based on a first indicator in the entry,
   wherein the route entry is generated from information learned by the dynamic routing protocol through another source;
   a generation logic block to, in response to a determination that the route corresponds to the black hole route, generate, at the network device, a route update advertisement that advertises a route of the route entry for the dynamic routing protocol, wherein the route update advertisement includes a second indicator that indicates the advertised route as the black hole route,
   wherein an unused bit in an Autonomous System (AS) external Link State Advertisement (LSA) associated with an Open Shortest Path First (OSPF) protocol is modified to facilitate the second indicator; and
   an advertisement logic block to advertise the route update advertisement 16 to a respective neighbor network device.

9. The network device of claim 8, wherein the dynamic routing 2 protocol is one or more of: Open Shortest Path First (OSPF) and Border Gateway Protocol (BGP).

10. The network device of claim 8, wherein the data structure includes a routing table generated by the dynamic routing protocol.

11. The network device of claim 8, wherein the determination logic block is further to: review the route entry for the route; wherein the first entry is a route type in the route entry.

12. The network device of claim 8, wherein the source includes one or more of: a second routing protocol, a static route, and a directly connected route.

13. A non-transitory machine-readable storage medium storing instructions, which when executed by a processor causes the processor to:
   determine, by a dynamic routing protocol on a network device, whether a route entry stored in a local data structure corresponds to a black hole route based on a first indicator in the entry,
   wherein the route entry is generated from information learned by the dynamic routing protocol through another source;
   in response to a determination that the route entry corresponds to the black hole route, generate, by the dynamic routing protocol at the network device, a route update advertisement that advertises a route of the route entry for the dynamic routing protocol, wherein the route update advertisement includes a second indicator that indicates the advertised route as the black hole route,
   wherein an unused bit in an Autonomous System (AS) external Link State Advertisement (LSA) associated with an Open Shortest Path First (OSPF) protocol is modified to facilitate the second indicator; and
   send, by the dynamic routing protocol, the route update advertisement to a respective neighbor network device.

14. The storage medium of claim 13, wherein the instructions, which when executed by the processor causes the processor further to modify an Attribute Type Code field in a Border Gateway Protocol (BGP) update message to facilitate the second indicator.

15. The storage medium of claim 13, wherein the data structure includes a routing table generated by the dynamic routing protocol.

16. The storage medium of claim 15, wherein the routing table is a Forwarding Information Base (FIB).

17. The storage medium of claim 13, wherein the instructions, which when executed by the processor causes the processor further to: review the route entry for the route; wherein the first indicator is a route type in the route entry.

18. The storage medium of claim 13, wherein the source includes one or more of: a second routing protocol, a static route, and a directly connected route.

* * * * *